Aug. 22, 1961

E. R. CHAFIN 2,997,251

AUTOMATIC TAPE MEASURE REEL

Filed May 22, 1959

2 Sheets-Sheet 1

INVENTOR.
EMERY R. CHAFIN,
BY
McMorrow, Berman + Davidson
ATTORNEYS.

Aug. 22, 1961 E. R. CHAFIN 2,997,251

AUTOMATIC TAPE MEASURE REEL

Filed May 22, 1959 2 Sheets-Sheet 2

INVENTOR.
EMERY R. CHAFIN,
BY
McMorrow, Berman & Davidson
ATTORNEYS.

United States Patent Office 2,997,251

Patented Aug. 22, 1961

2,997,251

AUTOMATIC TAPE MEASURE REEL

Emery R. Chafin, 3371 Shearin Ave., Lima, Ohio

Filed May 22, 1959, Ser. No. 815,147

4 Claims. (Cl. 242—107.6)

This invention relates to an automatic-wind measuring tape reel of the type having spring driven gearing for operating the reel for winding the tape thereon.

The primary object of the invention is to provide an improved, mechanically superior reel of the character indicated, which is structurally stronger and more resistant to being broken or crushed, and which eliminates the efforts and losses of working time involved in the use of hand-winding reels.

Another object of the invention is to provide a simpler, more compact, and weather and corrosion resistant reel of the character indicated above wherein the tape and its reel are isolated and sealed with respect to the spring means and gearing, so that moisture present on a reeled in tape will not reach the spring means and the gearing, and lubricant on the latter cannot reach the tape and its reel.

A further object of the invention is to provide a tape reel of the character indicated above wherein the pinion carrying tape reel spindle is freely journalled at its ends in the case of the reel and is positioned and held in place in the journals only by the securement of a cover on the open side of the case.

A still further object of the invention is to provide a tape reel of the character indicated above having a removable cover for the open side of its case, on which the spring driven gearing and its springs are mounted to come away with the cover as a unit upon removal of the cover, so as to expose and free the tape reel to be dropped out of the case, the said unit having assembled thereto a partition disc which serves to isolate the gearing and springs from the reel and its tape in the case.

Other important objects and advantageous features of the invention will be apparent from the following description and the accompanying drawing, wherein, for purposes of illustration only, a specific form of the invention is set forth in detail.

Figures 1, 2, 3:
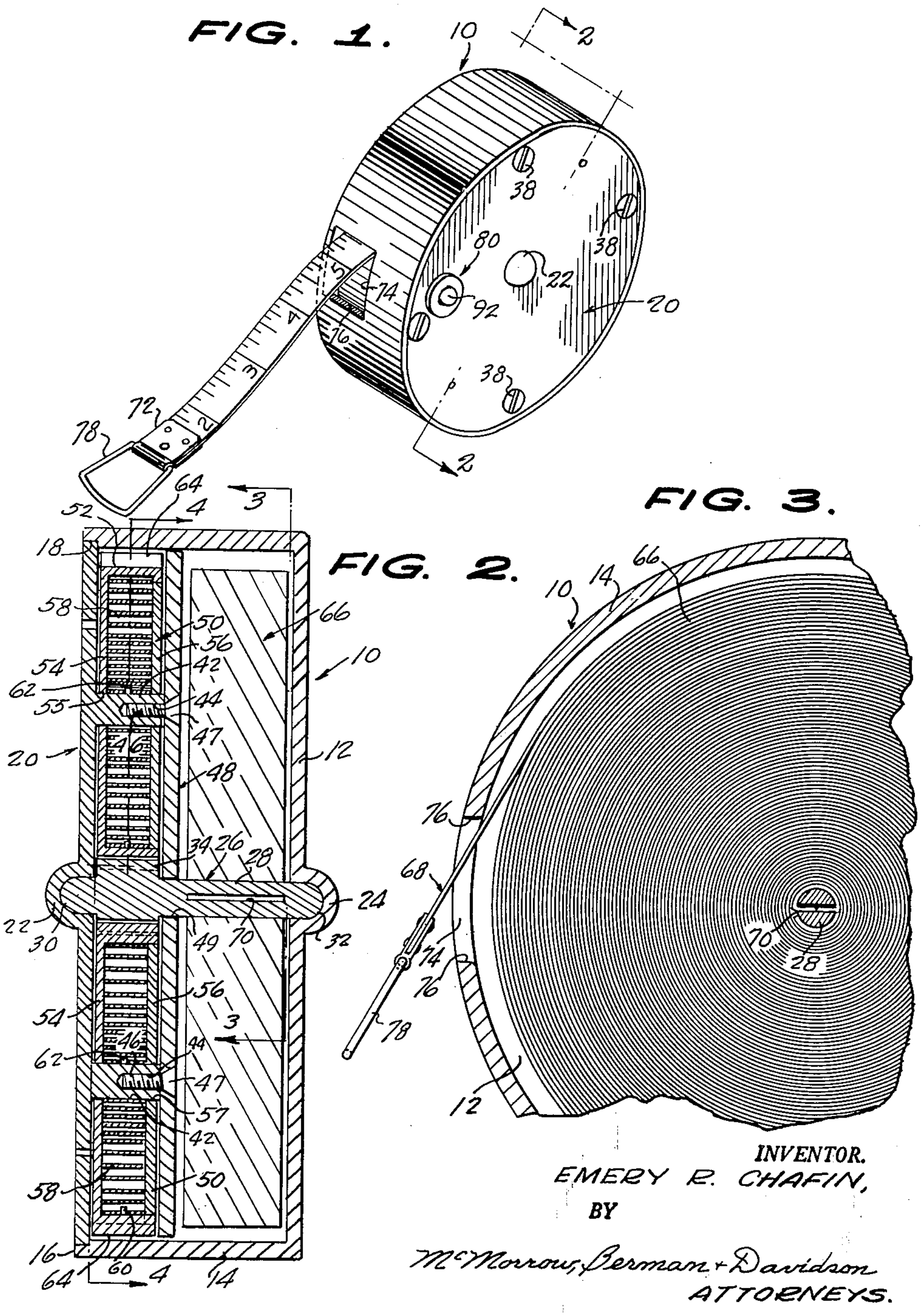
FIGURE 1 is a perspective view of a tape reel of the invention.
FIGURE 2 is an enlarged transverse section taken on the line 2—2 of FIGURE 1.
FIGURE 3 is a fragmentary transverse section taken on the line 3—3 of FIGURE 2.

Referring in detail to the drawings, wherein like numerals designate like parts throughout the several views, the illustrated measuring tape reel comprises a flat cylindrical pan-shaped case 10 having a flat side or bottom wall 12, and a circular side wall 14 having a free edge 16 defining the open side or top of the case 10. At and around the free edge 16 is an internal groove 18 which provides a seat for the peripheral edge of a removable, circular flat disc cover 20. At their centers, the cover 20 and the case bottom wall 12 have facing and axially aligned journal sockets, in the form of hollow hemispherical bosses 22 and 24 respectively. The case and the cover are preferably made of rigid, corrosion and rust-resistant metal.

Extending across the interior of the case 10 is a combined pinion and tape reel spindle 26 which comprises a preferably round shaft 28 having rounded upper and lower ends 30, 32 which seat rotatably in the journal bosses 22 and 24, respectively. The spindle shaft 28 has near its upper end an enlarged pinion 34. The spindle 26 is maintained in place and in operative engagement with the journal bosses solely by the cover 20 being in place in the open side of the case 10, by recess screws 38 traversing the cover at circumferential intervals, threaded into internal lugs 40 on the case sidewall 14.

Concentrically spaced inwardly from the peripheral edge of the cover 20 and fixed to the inner or under surface of the cover is a pair of diametrically opposed posts 42 having threaded sockets 44 in their inner ends, to receive screws 46 having tapered heads 47 fixed in a flat partition disc plate 48. The posts 42 are equally spaced from the center of the cover 20 and serve not only to space the partition plate from the cover, but as the shafts for two similar hollow flat cylindrical spring housings 50, formed to serve as gearwheels. The spindle shaft 28 traverses the partition plate 48 in a close fitting journal hole 49 therein.

The spring housings 50 comprise side walls 52 and outer or top walls 54 and inner or bottom walls 56, provided with central bearing openings 55 and 57, respectively, receiving the related posts 42. Protectively confined and enclosed in the housings 50 are spiral springs 58, wound around the posts 42, and having outer ends anchored to internal ears 60 in the housing sidewalls 52, and inner ends anchored to ears 62 on the posts 42. On the outer sides of the housing sidewalls 52 are gear teeth 64 which are in mesh with the spindle pinion 34, so that the pinion 34 turns the housings 50 in directions opposite to each other.

From the foregoing it will be seen that the spring housings 50 being confined on the posts 42 and between the cover 20 and the partition plate 48, and the pinion 34 being confined between the cover and the partition plate, a single drop-out unit 64 is provided which can be dropped out of the case 10 upon removal of the cover screws 38, so as to expose the tape reel winding 66, which is located in the case 10 between the partition plate 48 and the base bottom wall 12.

The tape winding 66 consists merely of a spiral winding of flexible steel or fabric measuring tape 68 having an inner end securably engaged through a longitudinal transverse slot 70 provided in the spindle shaft, and having an outer or free end 72 trained out through a circumferentially extending slot 74 provided in the casing sidewall 14 and formed with contoured end edges 76 which serve as wipers, for wiping moisture from the tape 68 as it is reeled into the case 10. The free end of the tape has fixed thereon a ring 78 wider than the slot 74 so as to have stop engagement with the case side wall. By judicious handling, upon removal of the unit 64, the tape winding can be made to come with and drop out with the unit. Otherwise, the tape winding will come out as the unit 64 is removed from the case, leaving peripheral spirals of the tape winding lying on the case bottom wall 12. In this case, the tethered inner end of the tape can be disengaged from the spindle slot 70, so as to permit removing the unit 64 from the case 10, while leaving the tape winding in the case 10, thereby eliminating the chance that the winding might become unwound if removed from the case.

It will be seen that the relatively great radial space provided between the small diameter spindle shaft 28 and the case sidewall 14 enables the accommodation of a relatively long measuring tape on the spindle shaft 28.

Figure 5:
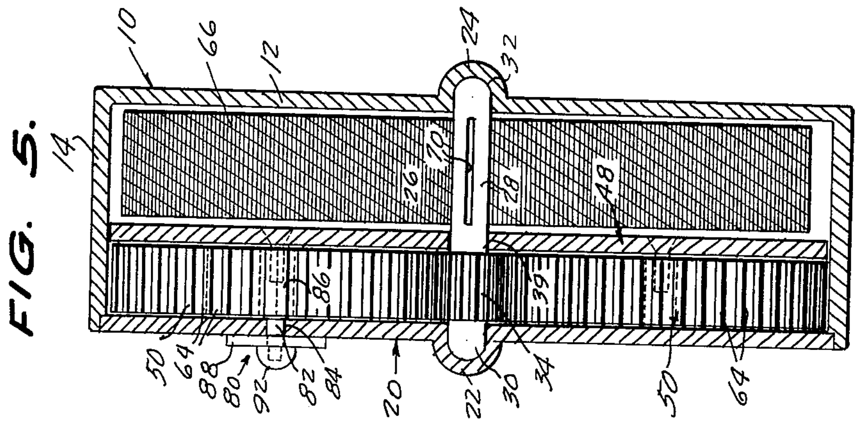
FIGURE 5 is a transverse section taken on the line 5—5 of FIGURE 4.
Figure 4:
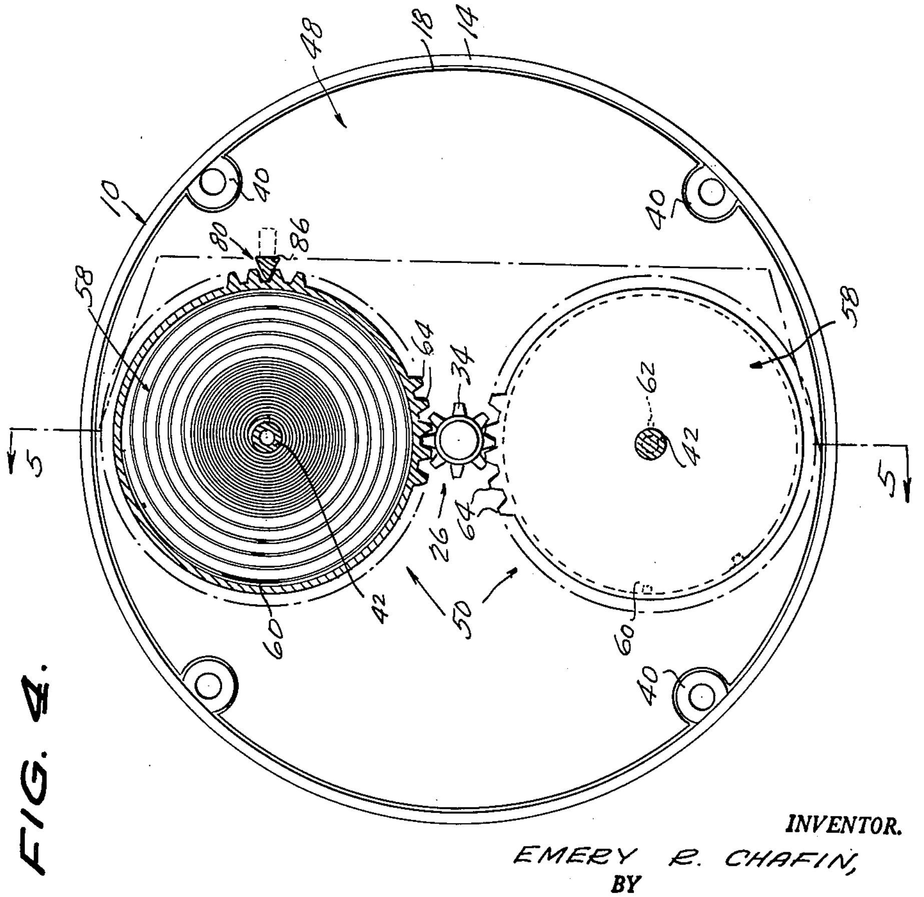
FIGURE 4 is a transverse section taken on the line 4—4 of FIGURE 2.

For releasably locking the gearing against reverse rotation thereof by unwinding action of the springs 58, which were wound and tightened on the posts 42 by a pulling out of the tape 68 from the case 10, there is provided on the cover 20 a radially slidable latch 80. The latch 80 comprises a pin 82, sliding in a radial slot 84 provided concentrically in the cover 20, having on its inner or lower end a triangular cross section dog 86, shaped and sized to engage freely between adjacent gear teeth 64 on one of the spring housings 50, as shown in FIGURES 4 and 5, when the pin 82 is pushed inwardly along the slot 84. On the outer or upper end of the latch pin 82 is mounted a slide plate 88 straddling the slot 84 and slidably engaged with the outer or upper surface of the cover 20, in opposition to an enlarged shoulder 90 on the dog 86 which is slidably engaged with the inner and lower side of the cover. A finger button 92 is secured, as by screw threading, on the outer or upper end of the pin 82, against the slide plate 88.

While there has been shown and described herein a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A measuring tape reel comprising a circular pan-shaped case having a bottom wall and a sidewall, said sidewall having a free edge defining an open top for the case, an annular seat on said free edge, a cover plate having a peripheral edge engaging said seat to close the case, said cover plate having an inner side having fixed thereon a pair of diametrically opposed downwardly extending posts having free inner ends, a partition disc plate engaged with the inner ends of the posts, means removably securing the partition plate to the inner ends of the posts with the partition plate spaced upwardly from the case bottom wall, a hollow flat closed cylindrical spring housing axially journalled on one of the posts between the cover plate and the partition plate, a spiral spring confined within said one housing and wound around said post and having an inner end anchored to said one of the posts and an outer end anchored to the housing, the sidewall of the housing having external gear teeth therearound, facing hollow journal bosses formed centrally on the cover plate and the case bottom wall, a spindle comprising a shaft extending between the cover plate and the bottom wall and through the partition plate, said spindle shaft having ends freely engaged in the journal bosses, said spindle shaft having a pinion in mesh with the gear teeth on the housing, said spindle shaft having a portion located between the partition plate and the case bottom wall, adapted for securement of the inner end of a winding of measuring tape thereon the case side wall having a slot through which the free end of the tape is adapted to be trained.

2. A measuring tape reel comprising a circular pan-shaped case having a bottom wall and a sidewall, said sidewall having a free edge defining an open top for the case, an annular seat on said free edge, a cover plate having a peripheral edge engaging said seat to close the case, said cover plate having an inner side having fixed thereon a pair of diametrically opposed downwardly extending posts having free inner ends, a partition disc plate engaged with the inner ends of the posts, first means removably securing the partition plate to the inner ends of the posts with the partition plate spaced upwardly from the case bottom wall, a hollow flat closed cylindrical spring housing axially journalled on one of the posts between the cover plate and the partition plate, a spiral spring confined within said one housing and wound around said post and having an inner end anchored to said one of the posts and an outer end anchored to the housing, the sidewall of the housing having external gear teeth therearound, facing hollow journal bosses formed centrally on the cover plate and the case bottom wall, a spindle comprising a shaft extending between the cover plate and the bottom wall and through the partition plate, said spindle shaft having ends freely engaged in the journal bosses, said spindle shaft having a pinion in mesh with the gear teeth on the housing, said spindle shaft having a portion located between the partition plate and the case bottom wall adapted for securement of the inner end of a winding of measuring tape thereon, the case sidewall having a slot through which the free end of the tape is adapted to be trained, second means on the case sidewall removably securing the cover plate in place, said cover plate, partition plate, said spring housing, and said spindle being removable from the case as a unit upon release of said second mentioned securing means.

3. A measuring tape reel comprising a circular pan-shaped case having a bottom wall and a sidewall, said sidewall having a free edge defining an open top for the case, an annular seat on said free edge, a cover plate having a peripheral edge engaging said seat to close the case, said cover plate having an inner side having fixed thereon a pair of diametrically opposed downwardly extending posts having inner ends, a partition disc plate engaged with the inner ends of the posts, means removably securing the partition plate to the inner ends of the posts with the partition plate spaced upwardly from the case bottom wall, hollow flat cylindrical spring housings axially journalled on said posts between the cover plate and the partition plate, spiral springs confined within said housings and wound around the posts and having inner ends anchored to the posts and outer ends anchored to the housings, the sidewalls of the housings having external gear teeth therearound, facing hollow journal bosses formed centrally on the cover plate and the case bottom wall, a spindle comprising a shaft extending between the cover plate and the bottom wall and through the partition plate, and having ends engaged in the journal bosses, said spindle shaft being positioned between the spring housings and having a pinion in mesh with the gear teeth thereon, said spindle shaft having a portion located between the partition plate and the case bottom wall, adapted for securement of the inner end of a winding of measuring tape thereon, the case side wall having a slot through which the free end of the tape is adapted to be trained, said spring housings being rotated together in opposite directions by rotation of the spindle produced by withdrawal of tape from the casing so as to tighten the springs, and releasable latch means mounted on the cover plate and engageable with gear teeth on a spring housing for preventing reverse rotation of the spring housings and the spindle by the springs while tape is withdrawn from the case.

4. A measuring tape reel comprising a circular pan-shaped case having a bottom wall and a sidewall, said sidewall having a free edge defining an open top for the case, an annular seat on said free edge, a cover plate having a peripheral edge engaging said seat to close the case, said cover plate having an inner side having fixed thereon a pair of diametrically opposed downwardly extending posts having inner ends, a partition disc plate engaged with the inner ends of the posts, means removably securing the partition plate to the inner ends of the posts with the partition plate spaced upwardly from the case bottom wall, hollow flat cylindrical spring housings axially journalled on said posts between the cover plate and the partition plate, spiral springs confined within said housings and wound around the posts and having inner ends anchored to the posts and outer ends anchored to the housings, the sidewalls of the housings having external gear teeth therearound, facing hollow journal bosses formed centrally on the cover plate and the case bottom wall, a spindle comprising a shaft extending between the cover plate and the bottom wall and through the partition plate, and having ends engaged in the journal bosses, said spindle shaft being positioned between the spring housings and having a pinion in mesh with the gear teeth thereon, said spindle shaft having a portion located between the partition plate and the case bottom wall, adapted for securement of the inner end of a winding of measuring tape thereon, the case side wall having a slot through which the free end of the tape is adapted to be trained, said spring housings being rotated together in opposite directions by rotation of the spindle produced by withdrawal of a tape from the casing so as to tighten the springs, and releasable latch means mounted on the cover plate and engageable with gear teeth on a spring housing for preventing reverse rotation of the spring housings and the spindle by the springs while tape is withdrawn from the case, said latch means comprising a radial latch slot provided in the cover plate, a pin working in said slot through the cover plate, a lateral dog on the inner end of the pin engageable with gear teeth in one position of the pin, and slide button means on the upper end of the pin, bridging the latch slot, said dog having a shoulder bridging the latch slot, with the button means and the shoulder engaging opposite sides of the cover plate.

References Cited in the file of this patent

UNITED STATES PATENTS

| | | |
|---|---|---|
| 506,649 | Watson | Oct. 10, 1893 |
| 583,830 | Wiley | June 1, 1897 |
| 604,656 | Fischer | May 24, 1898 |
| 612,451 | Anderson | Oct. 18, 1898 |
| 785,159 | Dice | Mar. 21, 1905 |
| 850,052 | Reare | Apr. 9, 1907 |
| 1,654,424 | Mahaffey | Dec. 27, 1927 |
| 2,586,386 | Ryan | Feb. 19, 1952 |
| 2,792,186 | Sadowsky | May 14, 1957 |